United States Patent
Choi et al.

(10) Patent No.: US 12,079,195 B2
(45) Date of Patent: Sep. 3, 2024

(54) APPARATUS AND METHOD FOR STORING FILE OF KEY VALUE STORE ON ZONED STORAGE

(71) Applicant: Industry-Academic Cooperation Foundation, Dankook University, Gyeonggi-do (KR)

(72) Inventors: Jong Moo Choi, Gyeonggi-do (KR); Myung Hoon Oh, Gyeonggi-do (KR)

(73) Assignee: INDUSTRY-ACADEMIC COOPERATION FOUNDATION, DANKOOK UNIVERSITY, Gyeonggi-Do (KR)

( * ) Notice: Subject to any disclaimer, the term of this patent is extended or adjusted under 35 U.S.C. 154(b) by 6 days.

(21) Appl. No.: 17/869,908

(22) Filed: Jul. 21, 2022

(65) Prior Publication Data
US 2023/0033773 A1   Feb. 2, 2023

(30) Foreign Application Priority Data
Jul. 29, 2021   (KR) .................. 10-2021-0099684

(51) Int. Cl.
*G06F 16/23*   (2019.01)

(52) U.S. Cl.
CPC ...... *G06F 16/2358* (2019.01); *G06F 16/2365* (2019.01)

(58) Field of Classification Search
CPC .......................... G06F 16/2358; G06F 16/2365
USPC .......................................................... 707/690
See application file for complete search history.

(56) References Cited

U.S. PATENT DOCUMENTS

| | | | |
|---|---|---|---|
| 11,360,708 B1* | 6/2022 | Farhan | G06F 3/061 |
| 11,515,911 B2* | 11/2022 | Lee | H04W 72/0446 |
| 2012/0072656 A1* | 3/2012 | Archak | G06F 16/134 |
| | | | 711/104 |
| 2017/0277452 A1* | 9/2017 | Joshi | G06F 3/0679 |
| 2020/0089607 A1* | 3/2020 | Gaonkar | G06F 12/0253 |

(Continued)

FOREIGN PATENT DOCUMENTS

| | | |
|---|---|---|
| JP | 2009-211235 A | 9/2009 |
| KR | 10-2017-0065732 A | 6/2017 |

(Continued)

OTHER PUBLICATIONS

Office action issued on Dec. 19, 2022 from Korean Patent Office in a counterpart Korean Patent Application No. 10-2021-0099684 (all the cited references are listed in this IDS.) (English translation is also submitted herewith.).

*Primary Examiner* — Hosain T Alam
*Assistant Examiner* — Nicholas E Allen
(74) *Attorney, Agent, or Firm* — The PL Law Group, PLLC

(57) ABSTRACT

An apparatus for storing a key value store file according to an embodiment includes a memory configured to record one or more key values in a predefined unit space based on a data input request from an outside, a controller configured to store data received from the memory in a storage, and the storage configured to include a plurality of zones. The controller is configured to perform a flush operation of storing one or more key values received from the memory as a file in a predefined format in the storage and a compaction operation of merging a plurality of files existing in one level in the storage and recording the merged files as one file in another level.

14 Claims, 7 Drawing Sheets

(56) References Cited

U.S. PATENT DOCUMENTS

2021/0165805 A1* 6/2021 Xie .................... G06F 16/278
2021/0216452 A1   7/2021 Muralidhara et al.

FOREIGN PATENT DOCUMENTS

| KR | 10-2019-0095089 A | 8/2019 |
| KR | 10-2020-0098971 A | 8/2020 |
| KR | 10-2021-0077467 A | 6/2021 |

* cited by examiner

400

APPARATUS AND METHOD FOR STORING FILE OF KEY VALUE STORE ON ZONED STORAGE

CROSS-REFERENCE TO RELATED APPLICATION(S) AND CLAIM OF PRIORITY

This application claims the benefit under 35 USC § 119(a) of Korean Patent Application No. 10-2021-0099684, filed on Jul. 29, 2021, in the Korean Intellectual Property Office, the entire disclosure of which is incorporated herein by reference for all purposes.

BACKGROUND

1. Field

The following description relates to a technology for storing files so that interference due to input and output of a key value is reduced in implementing a key value store on a zoned storage.

2. Description of Related Art

A key value store, also called a key value database, is a data storage format designed for storing, retrieving, and managing data, where most of the data is stored in the disk area in the format of a sorted string table (SSTable) file based on a log structured merge-tree (LSM-Tree) data structure.

In this regard, a zoned storage such as a zoned namespace SSD (ZNS SSD) and a shingled magnetic recording (SMR) disk has recently been used as a storage space for key value store files, and such zoned storage has a feature of providing the entire storage space by dividing it into a plurality of zones.

Here, in order to implement the key value store on the zoned storage, a flush operation that records user data from the memory area to the zoned storage and a compaction operation that merges data recorded on the zoned storage are required.

However, in the current key value store, the flush operation is performed in the foreground and the compaction operation is performed in the background at the same time, and as a consequence, a compaction operation that reads and writes a large amount of data and consumes a lot of storage bandwidth has to be performed, which may cause significant interference in the input and output performance of the flush operation. This causes a problem (latency spike) in which the response time of a user rapidly increases, which adversely affects the user experience.

As an example of the related art, Korean Patent Laid-Open Publication No. 10-2019-0095089 (published on Aug. 14, 2019) is disclosed.

SUMMARY

Disclosed embodiments are intended to provide a technology for storing a key value store file so that input/output (I/O) performance interference between a flush operation and a compaction operation on a zoned storage is reduced.

In one general aspect, there is provided an apparatus for storing a key value store file, the apparatus including: a memory configured to record one or more key values in a predefined unit space based on a data input request from an outside; a controller configured to store data received from the memory in a storage; and the storage configured to include a plurality of zones, in which the controller is configured to perform a flush operation of storing one or more key values received from the memory as a file in a predefined format in the storage and a compaction operation of merging a plurality of files existing in one level in the storage and recording the merged files as one file in another level, at least some of the plurality of zones being distinguished as flush zones and at least some of remaining zones thereof except for the flush zones being distinguished as compaction zones, the flush operation being performed using the flush zones and the compaction operation being performed using the compaction zones.

The storage may be connected to the controller through a plurality of channels and include a plurality of zones allocated for each of the plurality of channels, and the controller may be configured to distinguish between the flush zones and the compaction zones so that channels allocated to the flush zones are different from channels allocated to the compaction zones.

The flush zones may include an active flush zone inside which usable capacity exists and an immutable flush zone inside which there is no usable capacity, and the controller may be configured to, when performing a level 0 compaction operation of merging a plurality of files stored in the flush zone and recording the merged files as one file in the compaction zone, perform the level 0 compaction operation on a plurality of files stored in the immutable flush zone.

The controller may be configured to perform storage of the key values based on a log structured merge-tree (LSM-Tree) data structure.

The unit space may be a memtable of a preset size, and the file may be an SSTable file of a preset size.

The controller may be configured to build the plurality of zones in multi-layered levels according to the LSM-Tree data structure, inputs level information into each of the files according to hot-cold characteristics of the file, and store the file in a zone of a level matching the level information.

The level information may be determined based on at least one of an access frequency and an update frequency of each of the files.

In another general aspect, there is provided a method for storing a key value store file, the method including: recording, at a memory, one or more key values in a predefined unit space based on a data input request from an outside; distinguishing, at a controller, at least some of the plurality of zones stored in a storage as flush zones and at least some of remaining zones thereof except for the flush zones as compaction zones; performing, at the controller, a flush operation of storing one or more key values received from the memory as a file in a predefined format in the storage, by using the flush zones; and performing, at the controller, a compaction operation of merging a plurality of files existing in one level in the storage and recording the merged files as one file in another level, by using the compaction zones.

The storage may be connected to the controller through a plurality of channels and include a plurality of zones allocated for each of the plurality of channels, and the distinguishing may include distinguishing between the flush zones and the compaction zones so that channels allocated to the flush zones are different from channels allocated to the compaction zones.

The flush zones may include an active flush zone inside which there is usable capacity and an immutable flush zone inside which there is no usable capacity, and the performing of the compaction operation includes when performing a level 0 compaction operation of merging a plurality of files stored in the flush zone and recording the merged files as one file in the compaction zone, performing the level 0 compaction operation on a plurality of files stored in the immutable flush zone.

The controller may perform storage of the key values based on a log structured merge-tree (LSM-Tree) data structure.

The unit space may be a memtable of a preset size, and the file may be an SSTable file of a preset size.

The controller may build the plurality of zones in multi-layered levels according to the LSM-Tree data structure, inputs level information into each of the files according to hot-cold characteristics of the file, and store the file in a zone of a level matching the level information.

The level information may be determined based on at least one of an access frequency and an update frequency of each of the files.

DETAILED DESCRIPTION

Hereinafter, specific embodiments will be described with reference to the accompanying drawings. The following detailed description is provided to assist in a comprehensive understanding of the methods, devices and/or systems described herein. However, the detailed description is only for illustrative purposes and the disclosed embodiments are not limited thereto.

In describing the embodiments, when it is determined that detailed descriptions of related known technology may unnecessarily obscure the gist of the disclosed embodiments, the detailed descriptions thereof will be omitted. The terms used below are defined in consideration of functions in the disclosed embodiments, but may be changed depending on the customary practice or the intention of a user or operator. Thus, the definitions should be determined based on the overall content of the present specification. The terms used herein are only for describing the embodiments, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element.

In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms. These terms may be used to distinguish one element from another element.

For example, without departing from the scope of the present disclosure, a first element could be termed a second element, and similarly, a second element could be termed a first element.

Figure 1:
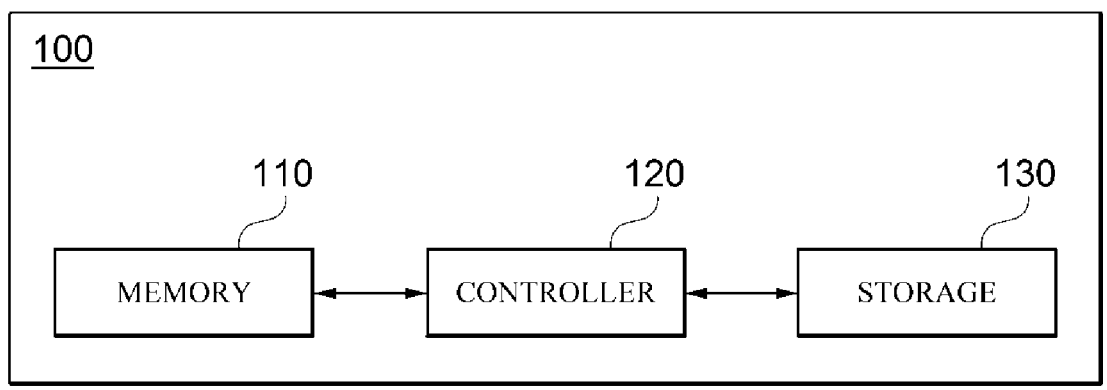
FIG. 1 is a block diagram illustrating an apparatus for storing a key value store file according to an embodiment.

FIG. 1 is a block diagram illustrating an apparatus for storing a key value store file (key value store file storage apparatus) 100 according to an embodiment.

As shown, the key value store file storage apparatus 100 according to an embodiment includes a memory 110, a controller 120, and a storage 130.

In the shown embodiment, each component may have different functions and capabilities in addition to those described below, and additional components may be included in addition to those described below.

In addition, in an embodiment, the memory 110, the controller 120, and the storage 130 may be implemented by using one or more physically separated devices, or may be implemented by one or more processors or a combination of one or more processors and software, and may not be clearly distinguished in specific operations, unlike the illustrated example.

The memory 110 records one or more key values in a predefined unit space based on a data input request from the outside.

The controller 120 stores data received from the memory in the storage 130 including a plurality of zones.

Specifically, the controller 120 performs (i) a 'flush' operation of storing one or more key values received from the memory 110 in the storage 130 as a file in a predefined format, and (ii) a 'compaction' operation of merging a plurality of files existing in one level in the storage 130 and recording the merged files as one file in another level.

In this case, the controller 120 distinguishes at least some of the plurality of zones included in the storage 130 as flush zones, and at least some of the remaining zones thereof except for the flush zones as compaction zones, such that the flush operation is performed using the flush zones and the compaction operation is performed using the compaction zones.

In more detail, in the following embodiment, 'flush' may refer to an operation of converting a series of data stored in an area of the memory 110 into a table sorted based on the keys and storing the table in an area of a disk when the size of the stored data exceeds a threshold value.

According to an embodiment, the controller 120 may perform storage of the key values based on a log structured merge-tree (LSM-Tree) data structure. In this way, it is possible to efficiently utilize the characteristics of storage, which has higher sequential write performance than random write performance.

Meanwhile, according to the LSM-Tree data structure described above, the controller 120 may store a file in the storage 130 in a multi-level tree structure, and when a file corresponding to a new key value is stored, even if the key of the file matches the key of the previously stored file, the existing key value is not updated and is newly stored in the uppermost layer of the multi-level tree structure. Then, when the corresponding file is retrieved, the retrieval is performed from the uppermost level among the multi-layered levels.

According to the LSM-Tree data structure, the unit space in the memory 110 may refer to a memtable of a preset size, and the file stored in the storage 130 may refer to a sorted string table (SSTable) of a preset size.

In the embodiments below, the 'SSTable file' is a file in the format of a table in which key values sorted based on keys are stored, and there is a space divided into individual segments for each different key in the file. When the size of the SSTable file stored in a specific level exceeds a preset threshold value, the SSTable file of the upper level is moved to the lower level, and a compaction operation of merging and sorting SSTable files with overlapping key areas occurs.

According to an embodiment, the controller 120 may be connected to the storage 130 through a plurality of channels, and in this case, the storage 130 may include a plurality of zones allocated to each of the plurality of channels. In this regard, a description will be given below with reference to FIG. 2.

Figure 2:
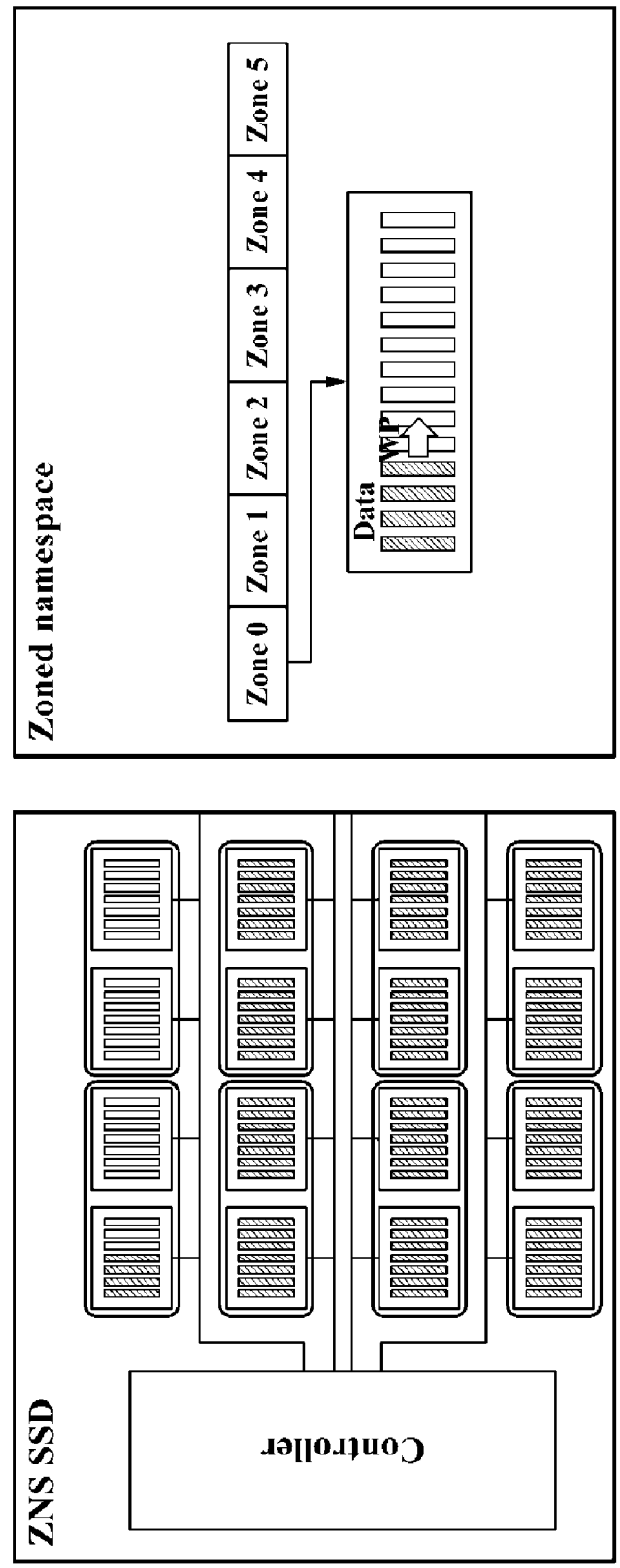
FIG. 2 is an exemplary diagram illustrating a configuration of a plurality of zones and channels in a zoned storage according to an embodiment.

FIG. 2 is an exemplary diagram 200 illustrating a configuration of a plurality of zones and channels in a zoned storage according to an embodiment.

Referring to FIG. 2, on the left side, a connection configuration between the controller 120 and the plurality of zones in the storage 130 through a plurality of channels in the zoned storage (e.g., ZNS SSD) is shown, and on the right side, a method in which data is recorded in each of the plurality of zones is conceptually shown.

First, as shown on the left side of FIG. 2, the controller 120 may be connected to each of a plurality of zones in the storage 130 through a plurality of channels. In FIG. 2, it is shown that there are four channels between the controller 120 and the storage 130 and two zones are connected to each channel, but this is exemplary, and the number of channels and the number of zones connected to each channel may be set in various ways according to embodiments.

According to an embodiment, when storing a file of a predefined format in the storage 130, the controller 120 may store the file by dividing the file and distributing divided ones for each of at least two zones among the plurality of zones in the storage 130.

In this case, the controller 120 may determine the number of divisions of the file based on the size of the file and the number of zones in the storage 130. For example, when the size of the SSTable file that the controller 120 wants to store is 12 MB and the number of zones to be used to store the corresponding file in the storage 130 is three, the controller 120 may store the SSTable file by dividing the file into three and distributing the divided ones to each zone by 4 MB.

As another example, when the SSTable file is composed of an index block, a filter block, and a data block, the controller 120 may store the SSTable file by dividing the SSTable file for each block into three and distributing the divided ones to each zone.

Meanwhile, when recording data in each zone, the controller 120 may sequentially write data using a write pointer (WP).

In this regard, on the right side of FIG. 2, a process is shown in which data is recorded in a first zone (Zone 0) among eight zones in the storage 130, where it can be seen that the WP sequentially points from the address of the left-most capacity to the address of the right-most capacity among the usable capacity of Zone 0, so that data is sequentially recorded.

Referring back to FIG. 1, assuming that the controller 120 and the storage 130 are connected through a plurality of channels and the storage 130 includes a plurality of zones allocated for each of the plurality of channels, in classifying at least some of the plurality of zones included in the storage 130 into flush zones and compaction zones, the controller 120 according to an embodiment may classify the zones into the flush zones and the compaction zones so that the channels allocated to the flush zones are different from the channels allocated to the compaction zones.

As a result, the plurality of channels connecting the controller 120 and the storage 130 are classified into flush channels connecting the controller 120 and flush zones in the storage 130, and compaction channels connecting the controller 120 and the compaction zones in the storage 130. In this regard, a description will be given below with reference to FIG. 3.

Figure 3:
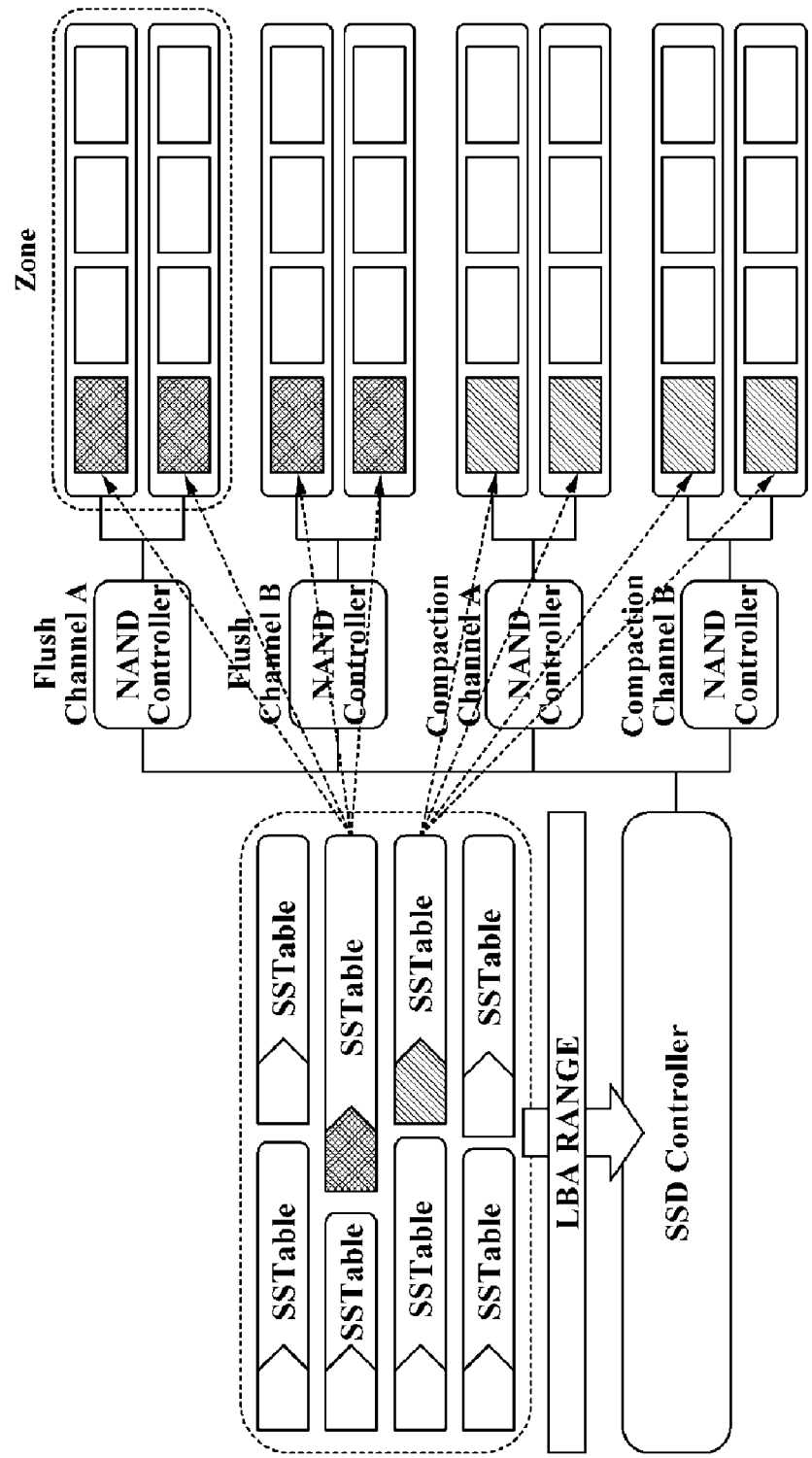
FIG. 3 is an exemplary diagram showing an embodiment in which flush zones and compaction zones are distinguished from each other.

FIG. 3 is an exemplary diagram 300 showing an embodiment in which flush zones and compaction zones are distinguished from each other.

Referring to FIG. 3, a zone-channel configuration in which flush zones or compaction zones are distinguishingly allocated for each of the channels between the controller 120 and the storage 130 is shown. Accordingly, it is assumed that each of the two files (e.g., SSTable files) is distributed and stored in each zone in the storage between the controller (e.g., SSD controller) and the storage as shown.

On the right side of FIG. 3, four zones included in the storage are connected to the controller by different channels. Specifically, the uppermost zone and the zone second from the top are flush zones connected to the controller through a flush channel A and a flush channel B, respectively, and the zone second from the bottom and the lowermost zone are compaction zones connected to the controller through a compaction channel A and a compaction channel B, respectively.

In this case, the flush channel A and the flush channel B are available even while the compaction operation is being performed on a specific SSTable file using two compaction zones through the compaction channel A and the compaction channel B, and thus it is possible to perform the flush operation on other SSTable files by using two flush zones regardless of whether the compaction operation is performed, enabling a quick response to the input/output request of a user.

Referring back to FIG. 1, the compaction operation by the controller 120 will be described.

The compaction operation is an operation that reads a plurality of files from one level in the storage and records them to another level in the storage, and thus is inevitably performed on two levels in the storage. In the following embodiments, among compaction operations, a compaction operation of reading and merging a plurality of files stored in the space of the uppermost level (level 0) in the storage and recording the merged files in the space of the lower level (level 1) is referred to as a 'level 0 compaction operation'.

However, in the zoned storage classified into flush zones and compaction zones, the level 0 compaction operation has to be performed between the flush zone and a first level compaction zone, and as a consequence, it is likely that input/output (I/O) interference occurs during the flush operation due to level 0 compaction operation.

In order to prevent the interference, at a time point when the level 0 compaction operation is performed, the controller 120 according to an embodiment may use a flush zone in which the flush operation is not performed at the time point to perform the level 0 compaction operation between the flush zone and the compaction zone.

Specifically, the flush zone may include an active flush zone inside which there is usable capacity and an immutable flush zone inside which there is no usable capacity, and in this case, the controller 120 may perform the level 0 compaction operation on a plurality of files stored in the immutable flush zone.

In other words, for the active flush zone, a flush operation may occur from the memory area since there is usable capacity inside the zone. Therefore, when the level 0 compaction is operation is performed on the immutable flush zone where there is no possibility of the flush operation, the possibility of I/O interference occurring in the flush operation by the level 0 compaction operation may be fundamentally blocked. Thereby, the user experience may be improved by preventing the problem of a rapid increase in response time to the flush operation (latency spike).

In this regard, a detailed description will be given with reference to FIG. 4.

Figure 4:
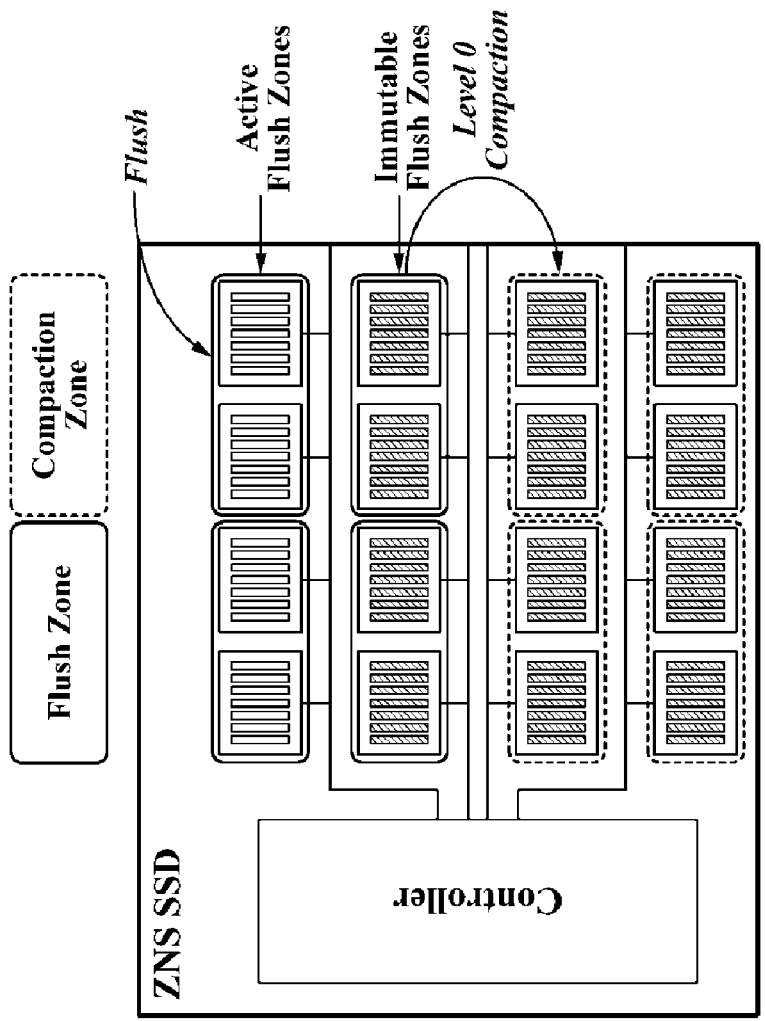
FIG. 4 is an exemplary diagram showing an embodiment in which a level 0 compaction operation is performed.
Figure 4:
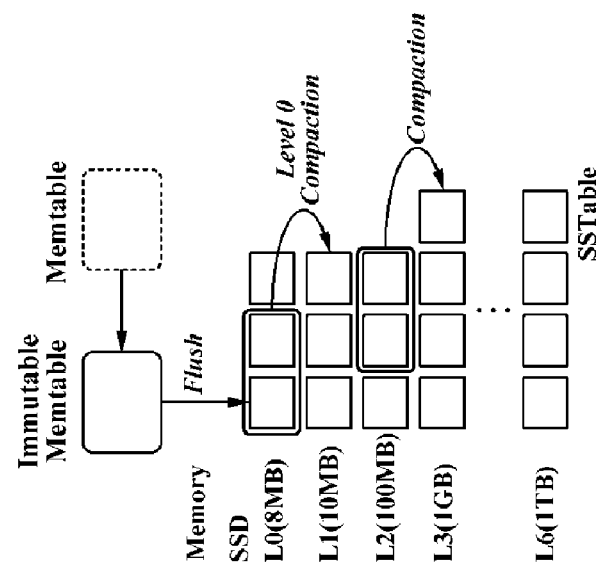

FIG. 4 is an exemplary diagram 400 showing an embodiment in which the level 0 compaction operation is performed.

Referring to FIG. 4, on the left side, a process of performing the flush operation, the level 0 compaction operation, and the compaction operation in the zoned storage that stores key values based on the LSM-Tree data structure is conceptually shown, and on the right side, the level 0 compaction operation method according to an embodiment capable of preventing interference during the flush operation is shown.

First, as shown on the left side of FIG. 4, in the area of the memory 110, data may be stored in a memtable of a preset size, and as such a process proceeds, when the size of the stored data exceeds the capacity of the memtable, the memtable is turned into an immutable memtable, and thus the flush operation for recording to the storage 130 may be performed.

Meanwhile, the storage 130 may include a storage space composed of multi-layered levels based on the LSM-Tree data structure, and on the left side of FIG. 4, a storage space composed of a total of seven levels is shown with the uppermost level being L0 and the lowermost level being L6. In addition, the capacity of the storage space for each level is 8 megabytes (MB) in L0, 10 megabytes in L1, 1 terabyte (TB) in L6, and so on, and increases from the upper layer to the lower layer. However, it should be noted that this is exemplary, and the number of levels of the storage space included in the storage 130 and the capacity of the storage space for each level may be variously set according to embodiments.

Under this structure of the storage space in the storage 130, the compaction operation in which a plurality of files stored in the storage space of the upper level are merged and recorded as one file in the storage space of the lower level may be performed. On the left side of FIG. 4, the compaction operation is shown in which the SSTable files stored in the storage space of L2 are merged and recorded as one SSTable file in the storage space of L3, but this is exemplary, and considering the above definition, the compaction operation may be performed without being limited to a specific level as long as it is performed between storage spaces of different levels, such as being performed between the storage space of L0 and the storage space of L1 or between the storage space of L5 and the storage space of L6.

However, in particular, the storage space of L0 has a specificity that it is used not only as a storage space where data is recorded during the flush operation, but also as a storage space from which data to be merged is selected during the compaction operation. Accordingly, the compaction operation performed between the storage space of L0 and the storage space of L1 may be separately referred to as the level 0 compaction operation.

Referring to the right side of FIG. 4, in order to prevent performance interference to the flush operation due to performing such a level 0 compaction operation, flush zones classified into active flush zones and immutable flush zones are shown.

Specifically, flush zones in a first column where data has not yet been recorded and there is usable capacity are set as the active flush zones, and flush zones in a second column where data has already been recorded and there is no usable capacity are set as the immutable flush zones.

As shown on the right side of FIG. 4, the level 0 compaction operation is performed in such a way that the files stored in the immutable flush zone are merged, and the merged files are recorded in the compaction zone.

In an embodiment, 'classification of flush zones' for setting each type of a plurality of flush zones as an active flush zone or an immutable flush zone may be performed by the controller 120. In this case, the controller 120 may monitor the usable capacity of each flush zone in real time or at a preset period to change and set the flush zone in which the usable capacity is lost among the active flush zones to the immutable flush zone, and change and set the flush zone in which the usable capacity is secured among the immutable flush zones to the active flush zone.

However, the entity performing the 'classification of flush zones' is not necessarily limited to the controller 120, and according to embodiments, a separate module (not shown) or a key in the key value store file storage apparatus 100 or a separate device (not shown) outside the key value store file storage apparatus 100 may perform the 'classification of flush zones'.

Referring back to FIG. 1, the controller 120 according to an embodiment may classify hot-cold characteristics of each file to be stored in the storage 130 or a pre-stored file, and arrange or rearrange each file based on the classified hot-cold characteristics.

Specifically, the controller 120 may arrange a hot file having an access frequency greater than or equal to a preset threshold value and a cold file having an access frequency less than the threshold value in different zones. In this regard, the following will be presented with reference to FIG. 5 below.

Figure 5:
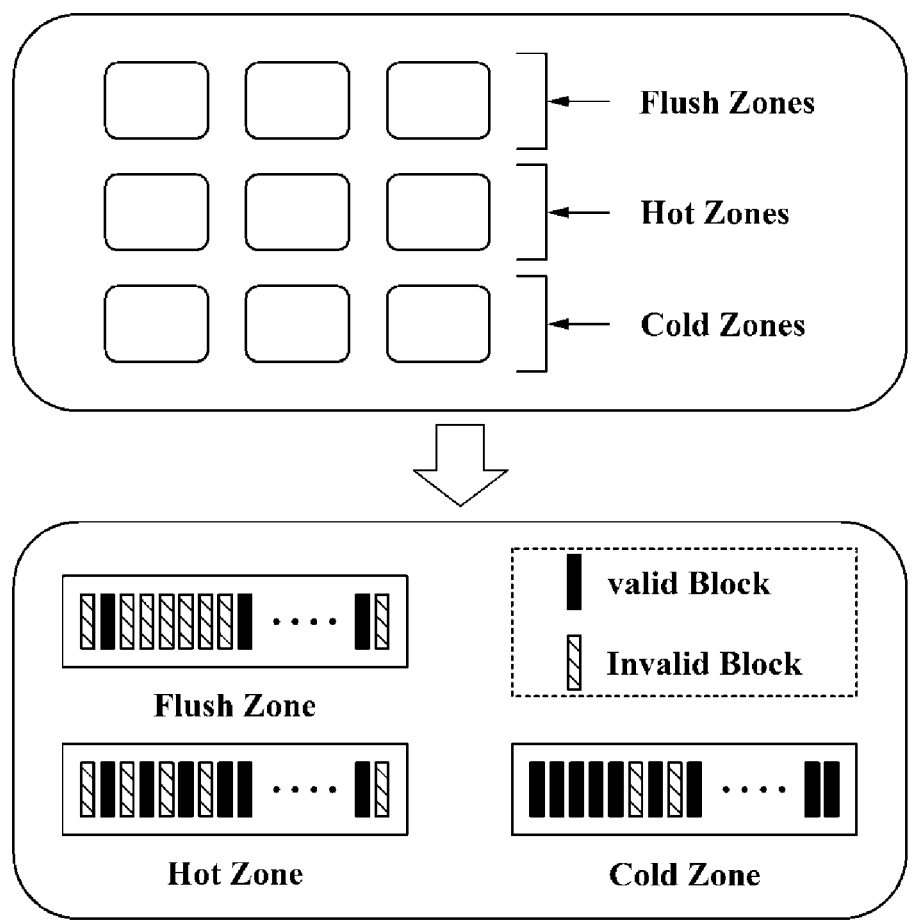
FIG. 5 is an exemplary diagram illustrating a file arrangement in consideration of hot-cold characteristics according to an embodiment.

FIG. 5 is an exemplary diagram 500 illustrating a file arrangement in consideration of hot-cold characteristics according to an embodiment.

Referring to FIG. 5, in implementing the key value store, flush zones, hot zones, and cold zones may be separated to classify and store data according to the LSM-Tree data structure level.

Specifically, before storing the file in each zone, the controller 120 may input level information to each file based on the hot-cold characteristics of each file. In this case, the level information about each file may be determined based on at least one of an access frequency and an update frequency of each of the files.

Therefore, hot files determined to have an access frequency and/or update frequency greater than or equal to a specific criterion are arranged in the hot zones, and cold files determined to have an access frequency and/or update frequency less than the specific criterion are arranged in the cold zones, and as a result, files are stored in the zoned storage in a distributed way, and at the same time, are classified according to hot-cold characteristics.

In this case, as shown in FIG. 5, the frequencies of blocks including valid data (valid blocks) and blocks including invalid data (invalid blocks) are biased for each zone, and in this way, it is possible to minimize the cost required for garbage collection of storage in the future and improve zone reclaim performance.

In some of the above-described embodiments, each of the memory 110, the controller 120, and the storage 130 may transmit and receive data such as a key value or a file including a key value through a communication network, where the communication network may include the Internet, one or more local area networks, wide area networks, cellular networks, mobile networks, other types of networks, or a combination of the above networks.

Figure 6:
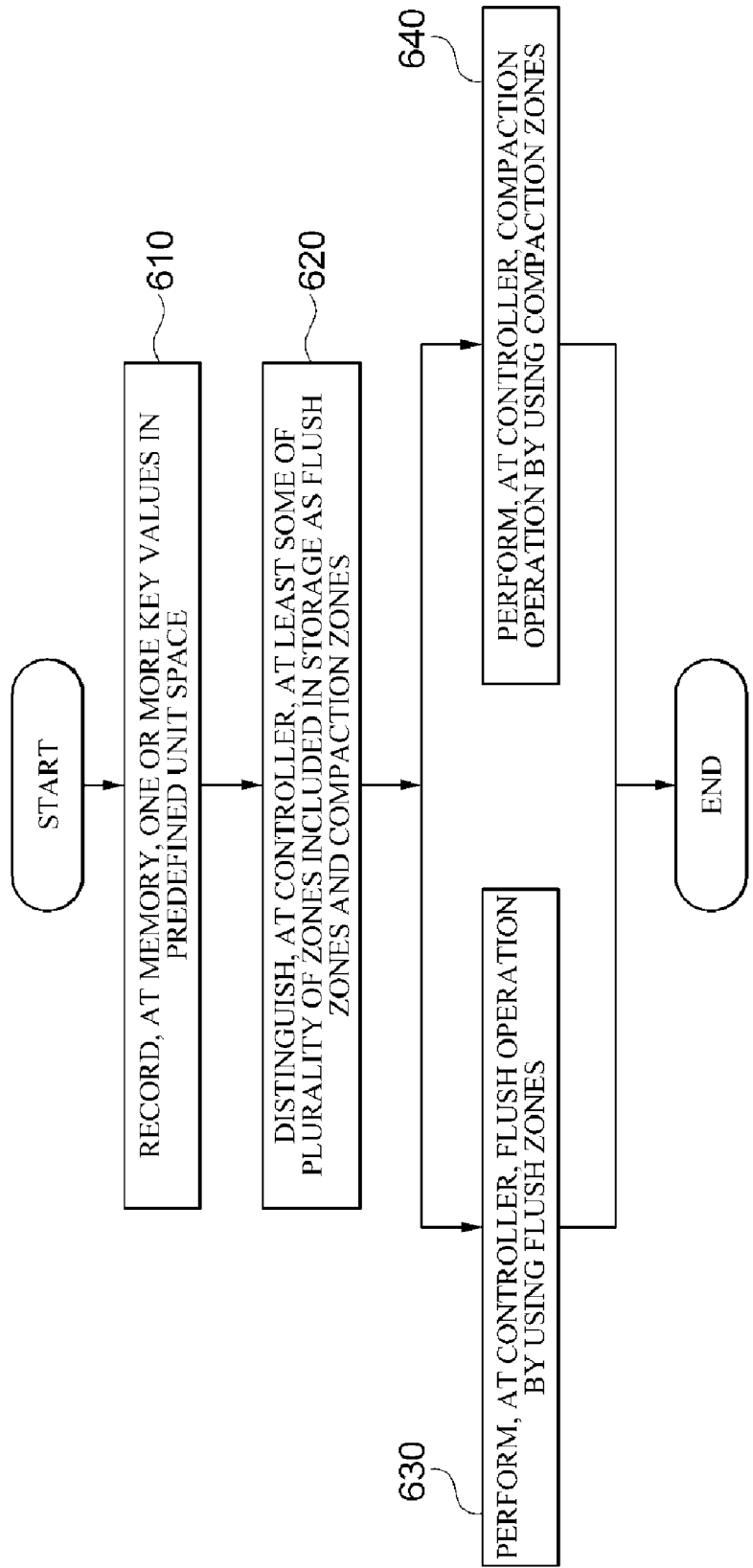
FIG. 6 is a flowchart illustrating a method for storing a key value store file according to an embodiment.

FIG. 6 is a flowchart illustrating a method for storing a key value store file according to an embodiment.

A method shown in FIG. 6 may be performed, for example, by the above-described key value store file storage apparatus 100.

First, the memory 110 in the key value store file storage apparatus 100 records one or more key values in a predefined unit space based on a data input request from the outside (610).

Then, the controller 120 in the key value store file storage apparatus 100 distinguishes at least some of the plurality of zones included in the storage 130 as flush zones, and at least some of the remaining zones thereof except for the flush zones as compaction zones (620).

Then, the controller 120 in the key value store file storage apparatus 100 performs the flush operation of storing one or more key values received from the memory 110 in the storage 130 as a file in a predefined format using the flush zone, by using the flush zones (630).

Meanwhile, the controller 120 in the key value store file storage apparatus 100 performs the compaction operation of merging a plurality of files existing in one level in the storage 130 and recording the merged files as one file in another level, by using the compaction zones (640).

In the shown flowchart, the method is divided into a plurality of steps; however, at least some of the steps may be performed in a different order, performed together in combination with other steps, omitted, performed in subdivided steps, or performed by adding one or more steps not shown.

In particular, by the key value store file storage apparatus 100, the flush operation and the compaction operation are performed using separate zones, the flush zones and the compaction zones, respectively, and in steps 630 and 640, one step may be performed before the other step, or both steps may be performed simultaneously.

Figure 7:
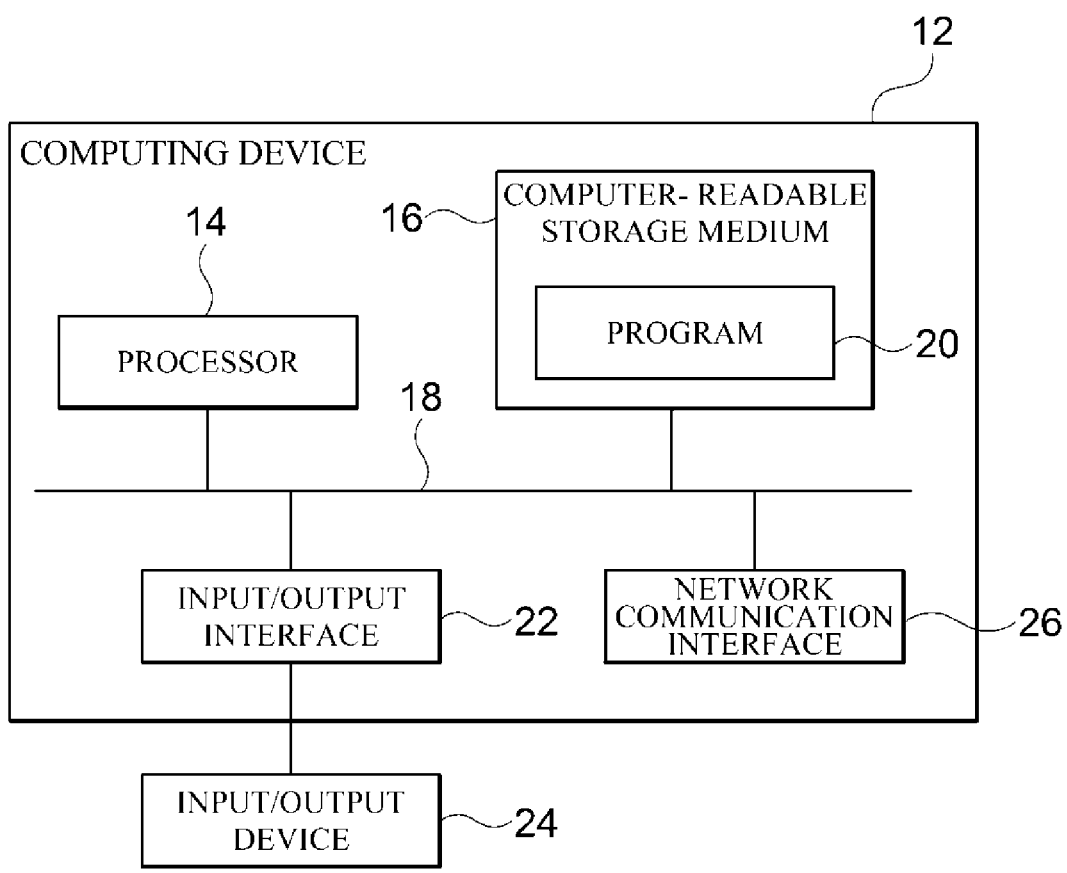
FIG. 7 is a block diagram for exemplarily illustrating a computing environment including a computing device according to an embodiment.

FIG. 7 is a block diagram for exemplarily illustrating a computing environment 10 including a computing device according to an embodiment. In the illustrated embodiment, each component may have different functions and capabilities in addition to those described below, and additional components may be included in addition to those described below.

The illustrated computing environment 10 includes a computing device 12. In an embodiment, the computing device 12 may be key value store file storage apparatus 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

The above-described embodiments may be implemented by a hardware component, a software component, and/or a combination of a hardware component and a software component. For example, the apparatus, method, and components described in the embodiments may be implemented by using one or more general purpose computers or special purpose computers, for example, like a processor, controller, arithmetic logic unit (ALU), digital signal processor, microcomputer, field programmable gate array (FPGA), programmable logic unit (PLU), microprocessor, or any other device capable of executing and responding to instructions. A processing device may execute an operating system (OS) and one or more software applications executed on the operating system. Further, the processing device may also access, store, manipulate, process, and generate data in response to execution of the software. For convenience of understanding, in some cases, one processing device is described as being used, but it will be apparent to those skilled in the art that the processing device includes a plurality of processing elements and/or a plurality of types of processing elements. For example, the processing device may include a plurality of processors or one processor and one controller. Other processing configurations are also possible, such as parallel processors.

Software may include a computer program, code, instructions, or one or more combinations thereof, for independently or collectively instructing or configuring the processing device to operate as desired. Software and/or data may be permanently or temporarily embodied in any type of machine, component, physical or virtual equipment, computer storage medium or device, or in a propagated signal wave in order to be interpreted by the processing device or provide instructions or data to the processing device. Software may be distributed over network coupled computer systems so that the software is stored and executed in a distributed manner. Software and data may be stored in one or more computer-readable recording media.

According to the disclosed embodiments, by classifying a plurality of zones in a zoned storage into zones in which a flush operation is performed and zones in which a compaction operation is performed, it is possible to reduce the occurrence of interference in the I/O performance of the flush operation due to the compaction operation performed in the background.

Further, according to the disclosed embodiments, by classifying the flush zones into an active flush zone and an immutable flush zone, it is possible to more effectively reduce interference that may occur during a level 0 compaction operation.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. An apparatus for storing a key value store file, the apparatus comprising:
   a memory configured to record one or more key values in a predefined unit space based on a data input request from an outside;
   a controller configured to store data received from the memory in a storage; and
   the storage configured to include a plurality of zones,
   wherein the controller is configured to;
   perform a flush operation of storing one or more key values received from the memory as a file in a predefined format in the storage and a compaction operation of merging a plurality of files existing in one level in the storage and recording the merged files as one file in another level, at least some of the plurality of zones being distinguished as flush zones and at least some of remaining zones thereof except for the flush zones being distinguished as compaction zones, the flush operation being performed using the flush zones and the compaction operation being performed using the compaction zones; and
   perform a level 0 compaction operation between the flush zone and a first level compaction zone, and, at a time point when the level 0 compaction operation is performed, use a flush zone in which the flush operation is not performed at the time point to perform the level 0 compaction operation between the flush zone and the compaction zone.

2. The apparatus of claim 1, wherein the storage is connected to the controller through a plurality of channels, and includes a plurality of zones allocated for each of the plurality of channels; and
   the controller is configured to distinguish between the flush zones and the compaction zones so that channels allocated to the flush zones are different from channels allocated to the compaction zones.

3. The apparatus of claim 1, wherein the flush zones include an active flush zone inside which there is usable capacity and an immutable flush zone inside which there is no usable capacity; and
   the controller is configured to, when performing a level 0 compaction operation of merging a plurality of files stored in the flush zone and recording the merged files as one file in the compaction zone, perform the level 0 compaction operation on a plurality of files stored in the immutable flush zone.

4. The apparatus of claim 1, wherein the controller is configured to perform storage of the key values based on a log structured merge-tree (LSM-Tree) data structure.

5. The apparatus of claim 4, wherein the unit space is a memtable of a preset size, and the file is an SSTable file of a preset size.

6. The apparatus of claim 4, wherein the controller is configured to build the plurality of zones in multi-layered levels according to the LSM-Tree data structure, input level information into each of the files according to hot-cold characteristics of the file, and store the file in a zone of a level matching the level information.

7. The apparatus of claim 6, wherein the level information is determined based on at least one of an access frequency and an update frequency of each of the files.

8. A method for storing a key value store file, the method comprising:
   recording, at a memory, one or more key values in a predefined unit space based on a data input request from an outside;
   distinguishing, at a controller, at least some of the plurality of zones stored in a storage as flush zones and at least some of remaining zones thereof except for the flush zones as compaction zones;
   performing, at the controller, a flush operation of storing one or more key values received from the memory as a file in a predefined format in the storage, by using the flush zones;
   performing, at the controller, a compaction operation of merging a plurality of files existing in one level in the storage and recording the merged files as one file in another level, by using the compaction zones,
   wherein a level 0 compaction operation is performed between the flush zone and a first level compaction zone, and, at a time point when the level 0 compaction operation is performed. a flush zone in which the flush operation is not performed is used at the time point to perform the level 0 compaction operation between the flush zone and the compaction zone.

9. The method of claim 8, wherein the storage is connected to the controller through a plurality of channels, and includes a plurality of zones allocated for each of the plurality of channels, and
   the distinguishing comprises distinguishing between the flush zones and the compaction zones so that channels allocated to the flush zones are different from channels allocated to the compaction zones.

10. The method of claim 8, wherein the flush zones include an active flush zone inside which there is usable capacity and an immutable flush zone inside which there is no usable capacity, and the performing of the compaction operation comprises when performing a level 0 compaction operation of merging a plurality of files stored in the flush zone and recording the merged files as one file in the compaction zone, performing the level 0 compaction operation on a plurality of files stored in the immutable flush zone.

11. The method of claim 8, wherein the controller performs storage of the key values based on a log structured merge-tree (LSM-Tree) data structure.

12. The method of claim 11, wherein the unit space is a memtable of a preset size, and the file is an SSTable file of a preset size.

13. The method of claim 11, wherein the controller builds the plurality of zones in multi-layered levels according to the LSM-Tree data structure, inputs level information into each of the files according to hot-cold characteristics of the file, and stores the file in a zone of a level matching the level information.

14. The method of claim 13, wherein the level information is determined based on at least one of an access frequency and an update frequency of each of the files.

* * * * *